United States Patent [19]
Ehrig et al.

[11] 3,885,950
[45] May 27, 1975

[54] COMPOSITION AND METHOD FOR INFLUENCING THE GROWTH OF PLANTS

[75] Inventors: Bodo Ehrig; Hermann Wolz, both of Leverkusen; Claus Hentschel, Cologne, all of Germany

[73] Assignee: Bayer Aktiengesellschaft, Leverkusen, Germany

[22] Filed: July 8, 1971

[21] Appl. No.: 160,962

[30] Foreign Application Priority Data
July 28, 1970  Germany............................ 2037289

[52] U.S. Cl.......................................... 71/85; 71/77
[51] Int. Cl................................................ A01n 9/00
[58] Field of Search........................... 71/85, 79, 65

[56] References Cited
UNITED STATES PATENTS

| | | | |
|---|---|---|---|
| 3,160,985 | 12/1964 | Ferguson et al. | 71/85 |
| 3,307,932 | 3/1967 | Guyot | 71/85 |
| 3,372,020 | 3/1968 | Regenstein, Jr. | 71/85 |
| 3,590,528 | 7/1971 | Shepherd | 71/79 |
| 3,592,910 | 7/1971 | Clark et al. | 71/85 |
| 3,707,807 | 1/1973 | Graves | 71/85 |
| 3,755,064 | 8/1973 | Maierson | 71/3 |

*Primary Examiner*—James O. Thomas, Jr.
*Attorney, Agent, or Firm*—Burgess, Dinklage & Sprung

[57] ABSTRACT

The growth of plants is influenced, e.g., promoted or altered, by application thereto or to their habitat of a polymer or copolymer derived from an olefinically or diolefinically unsaturated compound or mixtures of such polymers and/or copolymers.

13 Claims, No Drawings

COMPOSITION AND METHOD FOR INFLUENCING THE GROWTH OF PLANTS

The present invention relates to compositions for influencing, e.g. promoting, the growth of plants. Specifically, the invention is directed to the use as plant-growth-influencing agents of certain organic polymers.

Increasing the growth of tree nursery plants, ornamental plants, and especially vegetables, is desirable because in a given period of time with a given cultivated area a higher-than-usual yield can thereby be attained. A yield increase could also be achieved by promoting earlier blossoming in flower and ornamental-plant cultivation in the case of, for example, slow-growing and therefore particularly valuable plants (such as bromeliads and orchids) grown in greenhouses.

Economically, increasing the growth as well as promotion of earlier blossoming and cropping would be exceptionally interesting and profitable.

It is already known that, for example in pineapple cultivation, promotion of earlier blossoming, and thus an earlier harvest, can be achieved by the action of acetylene. For this purpose, either calcium carbide is dissolved in water and the cisterns of the pineapple plant are watered with this solution, or the cisterns are gassed directly with acetylene (see also J. L. Collins, "The Pineapple — Botany, Cultivation and Utilization", Interscience Publishers, Inc., New York, 1960, pp. 151 - 154).

This method of gassing the cisterns of bromeliads is also used in flower and ornamental-plant cultivation with the ever-increasing success of bromelia plants on the market.

Instead of acetylene, ethylene too has given good results (see KOSMOS, Vol. 66, No. 5, pages 160 - 163 (1970)).

No matter which of the known agents is used for blossom influencing, one disadvantage is always to be borne in mind: the intended effect can occur only if the plant possesses a certain measure of readiness to blossom. Plants which are too young do not react at all to the treatment, others again form rudimentary blossom organs so that the treatment likewise remains without success. There exists, therefore, a need for a universal method for decreasing the growth time until blossoming and cropping which is free from the above-described disadvantages of the conventional methods.

It has now been found that a growth increase as well as a promotion of earlier blossoming and cropping, especially in useful and ornamental plants, can be achieved by causing an organic polymeric material comprising a polymer or copolymer derived from an olefinically or diolefinically unsaturated monomeric compound or a mixture of such polymers and/or copolymers to act on the plants or their habitat. The polymeric materials per se are known.

The present invention, therefore, provides a plant-growth-influencing composition containing as active ingredient an organic polymeric material as defined above, in admixture with a solid diluent or carrier or in admixture with a liquid diluent or carrier containing a surface-active agent.

The present invention also provides a method of influencing the growth of plants which comprises applying to the plants or a plant habitat an organic polymeric material as defined above alone or in the form of a composition containing as active ingredient an organic polymeric material as defined above in admixture with a solid or liquid diluent or carrier.

It is decidedly surprising and was in no way to be foreseen that, by the action of these organic polymers on useful plants and ornamental plants or their habitat according to the process according to the invention, a considerable increase of plant growth and an economically profitable acceleration of blossoming and growth of such plants can be attained.

This new general process for growth increase as well as promotion of earlier blossoming and cropping in plant cultivation permits not only a substantial increase of yield but also gives, in addition, what in ornamental-plant cultivation is especially desirable, a brilliance of flower not to be attained according to other cultivation methods.

The conventional organic polymeric materials which can be used according to the invention are defined generally above. Preferred are those homopolymers or copolymers which can be prepared by polymerization from the following monomers:

a. esters of acrylic acid or methacrylic acid with 1–18 carbon atoms, preferably 1–8 carbon atoms, in the alcohol residue, for example methyl acrylate, ethyl acrylate, n-butyl acrylate, isobutyl acrylate, ethyl methacrylate, butyl methacrylate as well as their mixtures;

b. vinyl aromatics, for example styrene, halostyrenes or styrenes substituted by alkyl groups (the alkyl group of the vinyl group containing preferably 1 or 2 carbon atoms), such as methylstyrene, p-methylstyrene, o-isopropylstyrene and p-chlorostyrene;

c. vinyl esters of organic carboxylic acids which contain 2–16 carbon atoms, for example vinyl propionate, vinyl butyrate, vinyl benzoate, Versatic acid vinyl ester and, especially, vinyl acetate;

d. diene hydrocarbons, such as butadiene, isoprene, piperylene, 1,3-dimethylbutadiene, hexadi-1,3-ene, 4-methylpentadi-1,3-ene and chloroprene, preferably conjugated diene hydrocarbons with 4–6 carbon atoms;

e. $\alpha, \beta$-unsaturated nitriles of carboxylic acids with 3–5 carbon atoms, for example acrylonitrile or methacrylonitrile;

f. vinyl halides, for example vinylidene chloride, vinyl bromide, vinylidene bromide, vinyl fluoride and, especially, vinyl chloride;

g. mono-olefins with preferably 2–10 carbon atoms, such as ethylene, propylene, butylene, hex-1-ene, oct-1-ene or iso-octene.

Preferably, those polymers are used which do not harden or cross-link under the influence of atmospheric oxygen.

Preparation of the polymers to be used according to the invention from the monomers in known. It can be effected, for example, by solvent polymerization, emulsion polymerization, bead polymerization, suspension polymerization or precipitation polymerization (see "Methoden der organischen Chemie", Houben-Weyl, Vol. 14/1 (1961), pages 131–503).

In the following, particulars are given for the preparation, according to various polymerization processes, of organic polymers which can be used according to the invention.

If the polymers are prepared in solution by radical polymerization, the nature of the solvent is determined solely by the monomers used. In the case of anionic or cationic polymerization, as well as in the case of polymerization with "Ziegler-Natta" catalysts, the customary non-polar solvents, for example hydrocarbons, such as benzine, benzene or toluene, are used.

As polymerization catalysts, inorganic "per" compounds, such as potassium or ammonium persulfate, hydrogen peroxide and percarbonates, such as sodium percarbonate, organic peroxide compounds, for example acyl peroxides, such as benzoyl peroxide, alkyl hydroperoxides, such as tert.-butyl hydroperoxide, cumene hydroperoxide and p-methane hydroperoxide, dialkyl peroxides, such as di-tert.-butyl peroxide, peroxy esters, such as perbenzoic acid tert.-butyl ester, and azo compounds, for example azoisobutyric acid nitrile, are suitable. Advantageously, the inorganic or organic "per" compounds are used in combination with reducing agents in a known manner. Suitable reducing agents are, for example, sodium pyrosulfite or bisulfite, sodium formaldehyde sulfoxylate, triethanolamine and tetra-ethylenepentamine.

The polymerization in solution can be carried out with, besides peroxides:

a. anionic catalysts, such as lithium butyl, sodium phenyl or diphenyl dipotassium silane;

b. cationic catalysts, for example boron(III) fluoride; and c. complex catalysts of the "Ziegler-Natta" type, such as nickel acetonylacetate or aluminium sesquichloride.

The amount of catalyst lies within the limits usually appropriate in polymerization of the type, for example between 0.01 and 5 per cent by weight, with reference to the total amount of monomer.

In order to influence the molecular weight, the usual regulators, such as long-chain alkylmercaptans, diisopropyl xanthates, nitro compounds or organic halogen compounds, can be used in the polymerization.

If preparation of the polymers to be used according to the invention takes place in an emulsion, the emulsifier may be an anionic non-ionic or cationic emulsifiers or a combination of such emulsifiers.

Examples of cationic emulsifiers are salts of quaternary ammonium or pyridinium compounds.

As non-ionic emulsifying agents, the known reaction products of ethylene oxide with long-chain fatty alcohols or phenols are suitable; generally, reaction products of more than 10 moles ethylene oxide per mole of fatty alcohol or phenol are used.

The total amount of the above-mentioned emulsifiers can be between 0.5 and 20, preferably between 2 and 10, per cent by weight, with reference to the toal amount of monomer.

If preparation of the polymers takes place by bead polymerization, natural or synthetic high-molecular-weight substances are used as protective colloids. There may be mentioned for example: agar-agar, methyl cellulose, hydroxyethyl cellulose, polyvinyl alcohol or alkali metal salts of polyacrylic acid.

The polymerization temperatures are governed by the types of monomer used and the activation systems, and lie between 0° and 150°C, preferably between 40° and 90°C.

The organic polymers which can be used according to the invention accelerate strongly the growth of higher plants and can therefore be used as agents for increasing growth as well as for promoting earlier blossoming and cropping in useful and ornamental plant cultivation. The useful plants include for example the cultivated plants:

Compositae, such as lettuce (*Lactuca sativa*, especially var. *capitata*), leaf lettuce (*Lactuca sativa*, var. *crispa*); Cucurbitaceae, such as cucumber (*Cucumis sativus*), melon (*Cucumis melo*), pumpkin (*Cucurbita pepo*); Cruciferae, such as radish (*Raphanus*, var. *sativus*); Liliaceae, such as chive (*Allium schoenoprasum*); Umbelliferae, such as celery (*Apium*, var. *rapaceum*), parsley (*Petroselinum crispum*); Orchidaceae, such as kohlrabi (*Brassica oleracea gongyloides*); Solaneceae, such as tomato, (*Solanum lycopersicum*); Chenopodiaceae, such as spinach (*Spinacia oleracea*); Leguminosae, such as bean (*Phaseolus vulgaris*), pea (*Pisum sativum*); Gramineae, such as sugar cane (*Saccharum officinarum*), maize (*Zea*), rice (*Oryza sativa*); Solanaceae, such as tobacco (*Nicotiana tabacum*); Malvaceae, such as cotton (*Gossypium peruvianum*); Rosaceae, such as strawberry (*Frageria ananassa*); cotoneaster (*Cotoneaster dammei*); further, woody plants, for example Caprifoliaceae, such as honeysuckle (*Lonicera pileata*), snowberry (*Symphoricarpos racemosus*); Taxaceae, such as yew (*Taxus*); Ericaceae, such as erica (*Erica*); as well as various small woody plants, for example Sarcococca, Forsythia, Prunus, The ornamental plants include for example the following: Araliaceae, such as ivy (*Hedera helix*); Begoniaceae, such as begonia (*Begonia semperflorens*); Onagraceae, such as fuchsia (*Fuchsia*); Geraniaceae, such as pelargonium (*Pelargonium zonale*); Moraceae, such as rubber plant (*Ficus*); Gesneriaceae, such as columnea (*Columnea microphylla*); Malvaceae, such as China rose (*Hibiscus rosa-sinensis*); Liliaceae, such as tulip (*Tulipa gesneriana*), hyacinth (*Hyacinthus orientalis*); Iridaceae, such as gladiolus (*Gladiolus*); Polypodiaceae, such as fern (*Nephrolepis exaltata*), maidenhair fern (*Adiantum*), spleenwort (*Asplenium vidus*), stag-horn fern (*Platycerium alcicorne*); Compositae, such as chrysanthemum (*Chrysanthemum indicum*), aster (*Callistephas chinensis*), sunflower (*Helianthus*), dahlia (*Dahlia variabilis*), ageratum (*Ageratam houstonianum*); Euphorbiaceae, such as croton (*Codiaeum variegatum*), spurge (*Euphorbia*); Araceae, such as flamingo flower (*Anthurium*) or Rhaphidophora aurea; further, philodendron (*Philodendron*), dieffenbachia (*Dieffenbachia*) as well as various bed, balcony and group plants, for example salvias, petunias, calceolarias.

The polymeric compounds are especially suitable for causing in *Compositae* such as lettuce, in *Umbelliferae* such as parsley and in *Bromeliaceae*, such as pineapple, an increase of growth or a promotion of earlier blossoming and cropping. The growth increase manifests itself in head lettuce not in "shorting" but in an improved formualtion of the lettuce heads.

The polymeric compounds to be used according to the present invention are used preferably in the form of their aqueous dispersions. They may, however, be applied as such or be converted into the usual formulations, such as solutions, emulsions, suspensions, oils, powders, pastes and granulates. These may be produced in known manner, for example by mixing the active compounds with extenders, that is, liquid or solid diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes or benzene, chlorinated aromatic hydrocarbons, such as chlorobenzenes, paraffins, such as mineral oil fractions, alcohols, such as methanol or butanol, or strongly polar solvents, such as dimethyl formamide or dimethyl sulfoxide, as well as water.

As solid diluents or carriers, there are preferably used ground natural minerals, such as kaolins, clays, talc or chalk, or ground synthetic minerals, such as highly-dispersed silicic acid or silicates.

Preferred examples of emulsifying agents include non-ionic and anionic emulsifiers, such as polyoxyethylene-fatty acid esters, polyoxy ethylene-fatty alcohol ethers, for example alkylarylpolyglycol ethers, alkyl sulfonates and aryl sulfonates; and preferred examples of dispersing agents include lignin, sulfite waste liquors and methyl cellulose.

The polymers may in these applications forms also be present in admixture with other active compounds customary in plant cultivation, for example selective herbicides, fungicides and/or insecticides. The formulations contain, in general, from 0.1 to 99, preferably from 0.5 to 95, per cent by weight of the active polymeric compound.

The polymers may be introduced into the habitat of the plant by any of the methods usual in agriculture and horticulture, such as by watering, dusting, spraying, squirting, scattering and, where appropriate, also by soil injections or working into the soil (plant substrate), for example by ploughing or digging or by mixture with artificial substrates. By "habitat of the plant" are meant both natural and artificial substrates, including soilless cultures, as well as flooded cultures, such as are usual in the cultivation of rice, for example paddy rice.

The polymeric compounds can be mixed with the plant substrate both before sowing and after between sowing and emergence of the plants; the polymeric compounds may, however, also by applied after the emergence of the plants, for example by watering or spraying.

The amount used of the organic polymeric material may vary within fairly wide ranges: it depends essentially on the nature and extent of the desired effects. In general, the amounts applied are from 10 to 200 g. polymer/square meter, preferably from 50 to 100g/square meter.

When aqueous dispersions are used, the content of the organic polymer material is, in general, from 50 to 750g/liter.

If pot plants are treated using the process according to the invention, the amount applied is, in general, about 1 g. with a pot diameter of, on average, 6 cm.

The present invention is illustrated in and by the following Examples.

EXAMPLE A

Head lettuce test (growth increase)

Polybutadiene dispersion/loamy soil and peat soil/-transplanting box.

As the preparation of active compound, an aqueous polybutadiene dispersion with a content of polybutadiene of 30 per cent by weight was used which was obtained in a known manner by emulsion polymerization of butadiene (see, for example, "Methoden der Organischen Chemie", Houben-Weyl, Vol. 14/1 (1961), pages 131–503).

Different amounts of this polybutadiene dispersion were by thorough mixing worked into in each case equal parts by volume of soil which were in transplanting boxes equal to one other in size. In one case loamy soil (A) was used and in the other case peat soil (B) was used, the peat soil containing, from the outset, as standard fertilizer 2.5 kg NPK fertilizer (with 12 percent nitrogen content, 12 percent phosphorus pentoxide content and 20 percent potassium oxide content) and 3 kg calcium carbonate per cubic meter of peat.

Into the differently composed substrates so obtained there were transplanted the same number of head lettuce plants per transplanting box, and cultivation was effected for 32 days. At the same time, for comparison, the same number of control plants of head lettuce was cultivated in a further transplanting box in each case, the substrate being loamy soil or peat soil (of the composition stated above) not treated with polybutadiene dispersion, but otherwise under the same conditions.

For evaluation, after 32 days the average weight per head lettuce plant was determined, once in the fresh state and once in the dried state. The individual lettuce plants were cut off immediately above the soil, weighed, then dried and again weighed. The drying of the test plants was effected at 80°C. in a vacuum of 10 mm Hg for 60 hours.

From the following Table A (i) can be seen the amounts used of polybutadiene dispersion per unit volume of loamy soil (stated in ml dispersion/1000 cc loamy soil), the value "O" referring to the control experiment, and as results the measured average weights per test plant (in g) in the fresh and in the dried state:

Table A(i)

| Amount of polybutadiene dispersion (30% strength) per 1000 cc loamy soil (in ml) | Average weight per test plant (in g) (loamy soil) | |
|---|---|---|
| | fresh | dried |
| 0 | 2.5 | 0.34 |
| 10 | 4.4 | 0.51 |
| 50 | 4.1 | 0.52 |
| 100 | 3.2 | 0.36 |

From the following Table A(ii) can be seen the test conditions and results with the use of peat soil:

Table A(ii)

| Amount of polybutadiene dispersion (30% strength) per 1000 cc peat soil (in ml) | Average weight per test plant (in g) (peat soil) | |
|---|---|---|
| | fresh | dried |
| 0 | 3.65 | 0.27 |
| 10 | 12.50 | 0.69 |
| 50 | 14.05 | 0.80 |
| 100 | 15.00 | 0.84 |

EXAMPLE B

Head lettuce test ("head formation")

Polybutadiene dispersion/loamy soil and peat soil/-hotbed.

To several hotbeds which were filled with, in each case, 100,000 cc (=100 liters) of loamy soil or peat soil (as in Example A) there were applied by uniform watering by means of a watering can such amounts of an aqueous 30 percent — strength polybutadiene dispersion (as in Example A) that the same amounts per 1000 cc of loamy soil or peat soil are present as in the transplanting boxes according to Table A(i) or A(ii).

Into the so-treated hotbeds there were transplanted, for observation of head formation, in each case 12 lettuce plants which had beforehand been grown for 60 days in transplanting boxes with a substrate of the same composition. The plants are cultivated for a further 30 days until evaluation.

For comparison, in a control experiment for loamy soil and peat soil, respectively, in each case 12 untreated lettuce plants were cultivated for a total of, in each case, 90 days in hotbeds to which no polybutadiene dispersion had been applied.

The evaluation took place in the same way as stated in Example A.

Analogously with Table A(i) there can be seen from the following Table B(i) the test conditions and results with the use of loamy soil:

Table B(i)

| Amount of polybutadiene dispersion (30% strength) per 1000 cc loamy soil (in ml) | Average weight per lettuce head (in g) | |
|---|---|---|
| | fresh | dried |
| 0 | 31.9 | 3.34 |
| 10 | 33.9 | 3.36 |
| 50 | 43.8 | 3.56 |
| 100 | 52.4 | 4.26 |

(loamy soil)

From the following Table B(ii) can be seen the characteristic test conditions and results with the use of peat soil:

Table B(ii)

| Amount of polybutadiene dispersion (30% strength) per 1000 cc peat soil (in ml) | Average weight per lettuce head (in g) | |
|---|---|---|
| | fresh | dried |
| 0 | 21.2 | 2.24 |
| 10 | 97.1 | 8.35 |
| 50 | 74.4 | 7.30 |
| 100 | 84.9 | 9.08 |

(peat soil)

EXAMPLE C

Parsley test (growth increase)

Polybutadiene dispersion/peat soil/transplanting box.

Analogously with Example A, parsley plants were cultivated in peat soil which had been treated with different amounts of aqueous 30 percent strength polybutadiene dispersion, transplanted and cultivated for 21 days.

The evaluation took place as stated in Example A.

Analogously with Table A(ii), there can be seen from the following Table C the test conditions and results:

Table C

| Amount of polybutadiene dispersion (30% strength) per 1000 cc peat soil (in ml) | Average weight per plant (in g) | |
|---|---|---|
| | fresh | dried |
| 0 | 2.8 | 0.37 |
| 10 | 3.94 | 0.47 |
| 50 | 4.4 | 0.53 |
| 100 | 2.5 | 0.32 |

(peat soil)

EXAMPLE D

Parsley test (growth increase)

Polybutadiene oil/peat soil/transplanting box.

As the preparation of active compound, a 100 percent strength polybutadiene oil was used which was prepared in a known manner (see Example 1 of Belgian Patent Specification No. 742,971).

The test method and the evaluation method are the same as described in Example A. The test plants were cultivated for 21 days. Peat soil served as the substrate.

Analogously with Table A(ii), there can be seen from the following Table D the test conditions and the results:

Table D

| Amount of 100% strength polybutadiene oil per 1000 cc peat soil (in ml) | Average weight per plant (in g) | |
|---|---|---|
| | fresh | dried |
| 0 | 2.8 | 0.37 |
| 2.5 | 3.2 | 0.40 |
| 12.5 | 3.3 | 0.42 |
| 25 | 6.0 | 0.64 |
| 75 | 5.6 | 0.64 |

(peat soil)

EXAMPLE E

Leaf lettuce test (growth increase)

100 percent polybutadiene oil/loamy soil and peat soil/transplanting box.

Analogously with Example D, 100 percent polybutadiene oil was used as the active compound.

The test method was the same as described in Example A. The evaluation took place, with a total duration of the test of 35 days, on the 1st, 7th, 14th, 21st, 28th and 35th day, by determining the values for the "Number of leaves/length of leaves (in cm)", for test plants and control plants.

From the following Table E(i), there can be seen the test conditions and the results with the use of loamy soil:

Table E(i)

| Amount of 100% polybutadiene oil per 1000 cc loamy soil (in ml) | Number of leaves/length of leaves (in cm) Evaluation on | | | | | |
|---|---|---|---|---|---|---|
| | 1st day | 7th day | 14th day | 21st day | 28th day | 35th day |
| 0 | 2/2.5 | 2/2–3 | 4/3.5 | 6/5 | 8/7 | 10/7 |
| 2.5 | 2/1.5 | 4/3.5–4 | 5/4–4.5 | 6/5–6 | 8/5–6 | 9/6.5–7 |
| 12.5 | 2/3 | 4/4 | 5/5.5 | 6/6–7 | 8–9/7.7–5 | 10–11/7–8 |

(loamy soil)

Table E(i) — Continued

| Amount of 100% polybutadiene oil per 1000 cc loamy soil (in ml) | (loamy soil) Number of leaves/length of leaves (in cm) Evaluation on | | | | | |
|---|---|---|---|---|---|---|
| | 1st day | 7th day | 14th day | 21st day | 28th day | 35th day |
| 25 | 2/3 | 4/3–4 | 5/4.5 | 6/6–6.5 | 9/7.5–8.5 | 12/8–9 |
| 75 | 2/2.5 | 2–4/3–4 | 4/3.5–4 | 6/4–5 | 6/3.5–4 | 8/3.5–4.5 |

From the following Table E(ii), there can be seen the test conditions and the results with the use of peat soil.

Table E(ii)

| Amount of 100% polybutadiene oil per 1000 cc peat soil (in ml) | (peat soil) Number of leaves/length of leaves (in cm) Evaluation on | | | | | |
|---|---|---|---|---|---|---|
| | 1st day | 7th day | 14th day | 21st day | 28th day | 35th day |
| 0 | 2/2 | 2/1–4 | 4/2.5–4 | 5/3–3.5 | 6/4–5 | 6–8/4–6 |
| 2.5 | 2/1–2 | 2/3 | 4/3–4 | 6/4–5 | 6–7/4.5 | 10/5–6 |
| 12.5 | 2/2 | 2–4/3.5 | 4–5/3.5 | 6/4–6 | 8–9/5–6 | 10/7–9 |
| 25 | 2/2.5 | 2–4/3.5–4 | 4–5/3–4 | 6/5.5–6 | 9/6.5 | 10/7–8.5 |
| 75 | 2/2 | 2/3 | 4/3–4 | 5/4–5.5 | 8/5 | 10/6–6.5 |

EXAMPLE F

Leaf lettuce test (growth increase)

Polybutadiene dispersion/loamy soil and peat soil/transplanting box.

As the preparation of active compound, an aqueous 30 percent strength polybutadiene dispersion according to Example A was used. The test method was the same as described in Example A. The evaluation took place (analogously with Example E), with a total duration of the test of 35 days, on the 1st, 7th, 14th, 21st, 28th and 35th day, likewise by determination of the values for the "Number of leaves/length of leaves (in cm)", for test and control plants.

From the following Table F(i) there can be seen the test conditions and the results with the use of loamy soil:

Table F(i)

| Amount of polybutadiene dispersion (30% strength) per 1000 cc loamy soil (in ml) | (loamy soil) Number of leaves/length of leaves (in cm) Evaluation on | | | | | |
|---|---|---|---|---|---|---|
| | 1st day | 7th day | 14th day | 21st day | 28th day | 35th day |
| 0 | 2/2 | 2/2.5–3 | 4/3.5–4 | 4/5.5 | 6/5.5 | 9–10/6–7 |
| 10 | 2/2.5 | 3/3.5–4 | 4/5 | 6/7 | 9/7.5–8.5 | 12/8–9 |
| 50 | 2/2–2.5 | 2/3 | 4/4.5 | 6/7–8 | 9/8–9 | 12/11 |
| 100 | 1/1 | 2/1 | 2/1.5 | 3–4/2–3 | 5/3–4 | 8/6–7 |
| 300 | 1/0.5 | 1/0.5 | —/— | —/— | —/— | —/— |

From the following Table F(ii) there can be seen the test conditions and the results with the use of peat soil:

Table F(i)

| Amount of polybutadiene dispersion (30% strength) per 1000 cc peat soil (in ml) | (peat soil) Number of leaves/length of leaves (in cm) Evaluation on | | | | | |
|---|---|---|---|---|---|---|
| | 1st day | 7th day | 14th day | 21st day | 28th day | 35th day |
| 0 | 2/1.5 | 2/2.5–3 | 4/3–4 | 5/3–4 | 6–7/3.5 | 8/5–6.5 |
| 10 | 2/2.5 | 3/2.5–4 | 4–5/3.5–4.5 | 6/4.5–6 | 9/6–7 | 10/7–8.5 |

Table F(i) — Continued

| Amount of poly-butadiene dispersion (30% strength) per 1000 cc peat soil (in ml) | (peat soil) Number of leaves/length of leaves (in cm) Evaluation on | | | | | |
| --- | --- | --- | --- | --- | --- | --- |
| | 1st day | 7th day | 14th day | 21st day | 28th day | 35th day |
| 50 | 2/2 | 3/3–4 | 4/3.5–4 | 6/4.5–6 | 9/6–7.5 | 10/7.5–8.5 |
| 100 | 2/2 | 3/3–4 | 4/4 | 6/5–5.5 | 9/7–8 | 12/9.5–11 |
| 300 | 1/1 | 2/1 | 2/1 | 2/1 | 2/1 | 4/1.5 |

EXAMPLE G

Radish test

Polybutadiene dispersion/peat soil/transplanting box.

As the preparation of active compound, an aqueous 30 percent strength polybutadiene dispersion according to Example A was used.

The test plants were grown in two different substrates: (a) in peat culture substrate (type "TKE I"), that was young peat to which a mineral fertiliser in a form as fine as dust had been added so that the content of nitrogen was 180, phosphoric acid 180, potassium hydroxide 225, lime 1350 and magnesium 180 mg. per 1000 cc of substrate; and (b) in peat soil (as described in Example A) to which 10 ml of an aqueous 30 percent strength polybutadiene dispersion per 1000 cc of substrate were admixed.

The two sorts of freshly germinated radish plants were then transplanted analogously with Example A into peat soil which again contained various amounts of the same polybutadiene dispersion.

After a culture duration of 22 days, for evaluation analogously with Example E and F the values for the "Number of leaves/length of leaves (in cm)" were determined separately for the test plants grown according to (a) and according to (b).

From the following Table G can be seen the test conditions and the results:

Table G

| Amount of polybutadiene dispersion (30% strength) per 1000 cc peat soil (in ml) | (peat soil) Number of leaves/length of leaves (in cm) Plants germinated before transplanting in substrate | |
| --- | --- | --- |
| | a | b |
| 0 | 4–5/13–15 | 3–4/7–9 |
| 10 | 5–6/16–18 | 4/14–17 |
| 50 | 4/13–15 | 4–5/12–13 |
| 100 | 3–4/6–8 | 4/9–10 |

EXAMPLE H

Bromeliads test (growth increase and acceleration)

Copolymers/substrate for Epiphytes ("air plants")/pot culture

As preparation of active compound, three different copolymers were used which can be obtained in a known manner by emulsion copolymerization.

Copolymer A:

58 percent strength aqueous dispersion of a copolymer which was obtained from 60 percent butadiene, 34 percent styrene and 6 percent methacrylic acid.

Copolymer B:

45 percent strength aqueous dispersion of a copolymer which was obtained from 57 percent butadiene, 5 percent styrene and 38 percent acrylonitrile.

Copolymer C:

45 percent strength aqueous dispersion of a copolymer which was obtained from 58 percent n-butylacrylate, 2 percent acrylamide, 3 percent methacrylic acid amide N-methylolmethyl ether, 35 percent styrene and 2 percent acrylic acid.

Different amounts of the three copolymers A, B and C were worked into a soil mixture consisting of steamed compost soil, leaf mould (see J. Keller and H. K. Möhring, "Die Düngung in der gartnerischen Praxis", Verlag Paul Parey in Berlin and Hamburg, 1966, pages 11, 12 and 50) and sand in the ratio 2:1:1. With the use of this substrate, the two bromeliads *Nidularia Meyendorffii* and *Neoregelia Carolinae Tricolor* were potted, and cultivated for 4 months.

After this time, the growth and the general condition of the plant was assessed with regard to (1) rooting (2) shoots (sprouts) and (3) colouring.

For evaluation, 5 ratings were used which have the following meaning:

"Very good" = at least 3 sprouts, strong roots, unusual colour brilliance;

"good" = 1 sprout, very beautiful colour production;

"normal" = no discernible deviations or noteworthy differences from the control plants;

"moderate" = minor damage;

"poor" = growth impaired, greater damage, ("fall-offs"), discolored leaf-tips.

From the following Table H can be seen the characteristic test conditions and the individual evaluations:

Table H

| Amount of copolymer A, B and C per 1000 cc substrate (in ml) | | Evaluation of the effect on the bromeliads | |
| --- | --- | --- | --- |
| | | Nidularia Meyendorffii | Neoregelia Carolinae Tricolor |
| A: | 10 | very good | good |
| | 50 | good | very good |
| | 100 | moderate | good |
| B: | 10 | good | normal |
| | 50 | normal | normal |
| | 100 | normal | normal |
| C: | 10 | normal | good |
| | 50 | moderate | normal |
| | 100 | poor | poor |

It will be understood that the specification and examples are illustrative but not limitative of the present invention and that other embodiments within the spirit and scope of the invention will suggest themselves to those skilled in the art.

What is claimed is:

1. Method of increasing, stimulating and promoting the growth of plants which comprises applying to the soil of plants a dispersion comprising a dispersant, and, as an active ingredient, from 50 to 750 grams of an organic polymeric material selected from the group consisting of polybutadiene, a copolymer of butadiene, styrene and acrylic acid, a coplymer of n-butylacrylate, acrylamide, styrene and acrylic acid, a copolymer of butadiene, styrene and metharcylic acid, copolymer of butadiene, stryene and acrylonitrile and a copolymer of n-butylacrylate, acyrlamide, metharcylic acid amide N-methylolmethyl ether, styrene and acrylic acid.

2. Method as claimed in claim 1 wherein said polymeric material is polybutadiene.

3. Method as claimed in claim 1 wherein said polymeric material is a copolymer of butadiene, styrene and acrylic acid.

4. Method as claimed in claim 1 wherein said polymeric material is a copolymer of n-butylacrylate, acrylamide, styrene and acrylic acid.

5. Method as claimed in claim 1 wherein said polymeric material is applied to the soil in an amount between 10 and 20 grams of polymer per square meter of soil.

6. A method according to claim 5 wherein the plant is lettuce and the polymeric material is polybutadiene.

7. A method according to claim 5 wherein the plant is parsley and the polymeric material is polybutadiene.

8. A method according to claim 6 wherein the lettuce is head lettuce.

9. A method according to claim 6 wherein the lettuce is leaf lettuce.

10. A method according to claim 5 wherein the plant is radish and the polymeric is polybutadiene.

11. A method according to claim 5 wherein the plant is an Epiphytes and the polymeric material is a copolymer of butadiene, styrene and methacrylic acid.

12. A method according to claim 5 wherein the plant is an Epiphytes and the polymeric material is a copolymer of butadiene, styrene and acrylonitrile.

13. A method according to claim 5 wherein the plant is an Epiphytes and the polymeric material is a copolymer of n-butylacrylate, acrylamide, methacrylic acid amide N-methylolmethyl ether, styrene and acrylic acid.

* * * * *